United States Patent [19]

Nalewajek

[11] Patent Number: 4,795,624

[45] Date of Patent: Jan. 3, 1989

[54] LOW TEMPERATURE SYNTHESIS OF GRAPHITE BASED CARBON FLUORIDE AND CARBON FLUORIDE CHLORIDE

[75] Inventor: David Nalewajek, West Seneca, N.Y.

[73] Assignee: Allied-Signal Inc., Morris Township, Morris County, N.J.

[21] Appl. No.: 187,118

[22] Filed: Apr. 28, 1988

[51] Int. Cl.$^4$ .................. C01B 31/00; C01B 9/08; C01B 7/24

[52] U.S. Cl. .................. 423/439; 423/414; 423/489; 423/466

[58] Field of Search .............. 423/439, 414, 489, 466

[56] References Cited

U.S. PATENT DOCUMENTS

| | | | |
|---|---|---|---|
| 3,674,432 | 7/1972 | Margrave et al. | 23/205 |
| 3,950,262 | 4/1976 | Lalancette | 423/489 |
| 4,423,261 | 12/1983 | Watanabe et al. | 570/150 |

FOREIGN PATENT DOCUMENTS

| | | | |
|---|---|---|---|
| 55-51709 | 4/1980 | Japan | 423/439 |
| 2104884A | 3/1983 | United Kingdom | 423/439 |

OTHER PUBLICATIONS

Chemical Abstracts, vol. 85, 1976; p. 132.

*Primary Examiner*—John Doll
*Assistant Examiner*—Adriana L. Eng
*Attorney, Agent, or Firm*—Jay P. Friedenson

[57] ABSTRACT

The preparation of carbon fluoride and carbon fluoride chloride from a graphite intercalate is described. Treatment of group V-A pentahalide intercalates of graphite with fluorine or fluorine/chlorine gas mixtures at a temperature of about 300° C. results in the production of highly fluorinated $CF_x$; $X \geq 1$ or $(C_yF_xCl_z)_n$; $x \geq 1.0$, $y = 1$.

In the process, carbon fluoride or carbon fluoride chloride can be prepared from a highly ordered graphitic carbon at a temperature substantially lower than that of the decomposition temperature of the product, $CF_x$ or $(C_yF_xCl_z)_n$. In particular, carbon fluoride or carbon fluoride chloride is prepared from a group V-A pentahalogen intercalate and fluorine gas or fluorine/chlorine gas mixtures at temperatures in the order of 250°–300° C. The process provides a controlled, reproducible method of preparing a carbon fluoride or carbon fluoride chloride material from a graphite feedstock having fluroine-to-carbon ratios of 1 or greater from the pentahalide compound and fluorine gas or fluroine/chlorine gas mixtures at temperatures substantially removed from the decomposition temperature of the final product, thus eliminating the potential of an explosive reaction or the formation of unstable by-products.

21 Claims, No Drawings

LOW TEMPERATURE SYNTHESIS OF GRAPHITE BASED CARBON FLUORIDE AND CARBON FLUORIDE CHLORIDE

This invention relates to a process whereby graphite fluoride and graphite fluoride chloride can be prepared from a highly ordered graphitic carbon at a temperature substantially lower than that of the decomposition temperature of the fluorinated carbon ($CF_x$) and $(C_yF_xCl_z)_n$ product. More specifically, a method is provided for the preparation of graphite fluoride and graphite fluoride chloride from a group V-A pentahalogen intercalate and fluorine or fluorine/chlorine gas at temperatures as low as 250°–300° C.

BACKGROUND OF THE INVENTION

It is known that the reaction of carbon with fluorine or fluorine/chlorine at sufficiently high temperature to induce reaction leads to the formation of stoichiometric and non-stoichiometric carbon fluoride products, $CF_x$ or carbon fluoride chloride products, $(C_yF_xCl_z)_n$. The nature of the product depends not only on the temperature but on the carbon used in the reaction. These materials are currently in demand because they exhibit unique properties due to the varying degree of covalently bonded fluorine (the x value). Included among typical uses are: solid lubricants or lubrication additives, e.g., U.S. Pat. Nos. 3,717,576 and 3,988,137; water repellants, e.g., U.S. Pat. No. 3,856,686 and as a cathode active component in a non-aqueous primary cell, e.g., U.S. Pat. No. 3,536,532. As a measure of good performance, the materials must exhibit high temperature and pressure stability. This is usually achievable only if the fluorine to carbon ratio is 1 or greater. This combination of properties is acknowledged in the art as being usually found in graphite based materials, as opposed to carbon black based materials.

The synthesis of graphite based $CF_x$ is accomplished at around 620°–635° C. Typical of the synthetic procedures is that disclosed in U.S. Pat. No. 3,674,432 to Margrave, et al. This patent details the conditions required to form $CF_x$ from a graphite feedstock. As described in this patent, a very narrow temperature range of 624°–630° C. is required to prepare $CF_x$ of the desired fluorine to carbon ratio ($x \geq 1$). Using temperatures substantially below that described in the Margrave work results in the formation of incompletely fluorinated products (35–53% fluorine content; $x = 0.34–0.71$) and does not produce a product with the desirable characteristic alluded to above reference being made to Japanese Kokai No. 76-30,597 and to Chem. Abstr. No. 85:48901b.

The hazards of fluorinating graphite at temperatures close to the decomposition temperature of the product $CF_x$ are recognized. In column 8, lines 27–30 of U.S. Pat. No. 3,674,432, for example, it is noted that a too rapid increase in fluorine pressure or an increase in the fluorine pressure to a point above the reaction pressure may cause an explosion. Since that time, more comprehensive studies of the thermal decomposition of graphite fluoride under various conditions have been made with similar conclusions. Depending upon the atmosphere present during the thermal degradation experiments, a decomposition temperature as low as 562° C. has been observed in an oxygen atmosphere. These results imply that the more oxidizing the atmosphere, the greater the probability of decomposition occurring at a lower temperature. In view of the strong oxidizing power of fluorine, it becomes apparent that thermal decomposition of $CF_x$ could occur during its manufacture if the partial pressure (% volume) of fluorine reached a critical value at these elevated temperatures. Consequently, the propagation of gaseous fluorocarbon by-products would be enhanced, the formation of which could result in a violent explosion.

It is thus seen that a need exists to define a safe process for the production of $CF_x$ from a graphite feedstock. A method of producing a graphite based $CF_x$, for example, at a temperature substantially lower than the decomposition temperature would be desirable. A need also exists to define a safe process for the production of carbon fluoride chloride from a graphite feedstock.

SUMMARY OF THE INVENTION

It is an object of this invention to provide a method of producing a graphite based $CF_x$ of fluorine to carbon ratio of 1 or greater at a temperature substantially lower than the decomposition temperature of the final product.

It is another object of the invention to provide a controlled, reproducible method of preparing a carbon fluoride material from a graphite feedstock having fluorine-to-carbon ratios of 1 or greater.

It is yet another object of this invention to provide a method of producing graphite based $(C_yF_xCl_z)_n$ of fluorine to carbon ratio of 1 and a chlorine to carbon ratio of at least 0.001 up to a limiting value of 0.1. The value of n can vary widely and is used to denote an infinite two dimensional array of $(C_yF_xCl_z)$ units.

In accordance with the invention, I have discovered that the desired carbon fluorides can be prepared from graphitic carbon intercalated with a group V-A pentahalide compound and fluorine gas at temperatures substantially lower than the decomposition temperature of the final product thus eliminating the potential of an explosive reaction or the formation of unstable by-products. By using this method, carbon fluorides having fluorine-to-carbon ratios of one or greater can be produced at temperatures as low as 250° C. I have further discovered, that by changing the diluent gas from nitrogen to chlorine, the desired carbon fluoride chloride of composition $(C_yF_xCln)_n$ can be produced.

The usual apparatus for fluorinating or fluorochlorinating carbon may be employed to carry out this reaction. Typically either a fixed bed or fluid bed apparatus may be used.

DETAILED DESCRIPTION OF THE INVENTION

Carbon fluoride as contemplated in the embodiment of this invention can be prepared by reacting fluorine gas with a graphite which has been intercalated with a group V-A pentahalide compound. Analogously, carbon fluoride chloride can be prepared by reacting fluorine gas in a chlorine diluent atmosphere with a graphite-intercalate derived from the group VA pentahalide class.

Graphite is defined by those skilled in the art as a crystalline allotropic form of carbon characterized by a hexagonal arrangement of the atoms. Since most forms of carbon contain some graphitic character, the term graphite-intercalate is used to describe the general class of carbon materials which can be intercalated with group V-A pentahalide compounds to some extend and subsequently reacted with fluorine or fluorine/chlorine mixtures to produce $CF_x$ or $(C_yF_xCl_z)_n$. However, the most efficient conversion of a graphite intercalate to $CF_x$ and $(C_yF_xCl_z)_n$ occurs when a carbon exhibiting strong graphitic structural characteristics is reacted with fluorine of fluorine/chlorine gas; i.e., natural or synthetic graphite.

Any of the well known physical forms of graphite can readily be intercalated with a group V-A pentahalide compound, such as graphite fibers, graphite filaments graphite rods, spheres, gaskets and the like. The resulting graphite intercalate can then be reacted with fluorine or fluorine/chlorine gas in accordance with the invention.

In the preparation of graphite fluoride by prior art methods, precise control of the reaction temperature has been considered to be essential to avoid the problems of poor reproducibility and potential detonation. A critical temperature of 627±3° C. was generally considered necessary to be maintained for at least about 13 hours to produce a graphite based $CF_x$ with a fluorine-to-carbon ration $\geq 1$. Even though reasonable product reproducibility was demonstrated by operating in this temperature regime, product yields varied due to the conversion of the graphite or fluorinated graphite to other fluorinated products at these extreme temperature conditions.

In contrast, as detailed in the description of the present invention, a process has been devised whereby $CF_x$ of fluorine-to-carbon ratio of 1 or greater can be prepared at temperatures as low as 250° C. and reaction times as short as 7 hours. To effect the conversion of the graphite intercalate to $CF_x$, the intercalate can be heated in the temperature range of 250°–500° C. for 4–12 hours in a fluorine/nitrogen gas stream with a fluorine content of 5–50% by volume and preferably 15–20% by volume. Using these conditions, the carbon fluoride which is prepared has a minimum fluorine-to-carbon ratio of 1 and is produced reproducibly in high yield due to minimization of by-product formation at this lower temperature.

This process is also applicable to the synthesis of graphite fluoride chloride, $(CF_xCl_z)_n$, of fluorine to carbon ratio of at least 1 and chlorine to carbon ratio of at least 0.001 but not exceeding 0.10, at a temperature as low as 300° C. and a reaction time of 8 hours. To effect the conversion of the intercalated graphite $(C_yF_xCl_z)_n$, the intercalate can be heated in the temperature range of 250°–500° C. for 4–12 hours in a fluorine/chlorine gas stream with a fluorine content of 5–50% by volume. Using these conditions, the carbon fluoride chloride which is prepared meets the specifications set forth above.

The graphite-intercalate contemplated in the use of this invention can be selected from the group consiting of graphite and group V-A pentahalide compounds. The preferred group V-A pentahalide compounds are selected from the group consisting of antimony or arsenic chlorides, fluorides, bromides or iodides; the most preferred for this use being antimony pentachloride due to ease of handling. The graphite-intercalate can be obtained from commercial sources or prepared as described by Ballard et al. "Intercalation of Antimony Pentafluoride and Antimony Pentachloride into Graphite: Antimony-121 Mossbauer Evidence for the Oxidation States Present", *J. Chem. Soc., Chem. Commun., Dalton*, (1976), pp 1859–1860; or Jones et al. "The Microstructure, Molecular Constituents, and Stability of the Graphite-Antimony Pentachloride Intercalate", *J. Chem. Soc., Chem. Commun.*, (1983), pp 468–469.

The carbon fluoride and carbon fluoride chloride thus produced by this reaction is substantially free of antimony pentahalogen contamination since during the reaction with fluorine the resulting group V-A pentahalide compound is volatilized from the final $CF_x$ or $(C_yF_xCl_z)_n$ product. This can be represented by the following equation which illustrates the reaction of graphite-antimony pentachloride intercalate with fluorine gas:

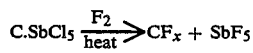

$$C \cdot SbCl_5 \xrightarrow[\text{heat}]{F_2} CF_x + SbF_5$$

The liberated antimony pentafluoride is collected in a trap and can be used either in this process to prepare a graphite-antimony pentafluoride intercalate for subsequent fluorination or supplied as a reagent for other commercial uses.

The carbon fluoride thus produced in accordance with the present invention exhibits high temperature and pressure stability. The process allows for the preparation of a graphite-based $CF_x$ at a temperature substantially lower than the decomposition temperature of the final product thus eliminating the potential of an explosion, production of unstable by-products and reproducibility problems.

Similarly, the carbon fluoride chloride produced in accordance with the present invention exhibits high pressure and thermal stability. The process allows for the preparation of $(C_yF_xCl_z)_n$ compositions at temperatures substantially reduced from the decomposition temperatures of the final product and in short reaction times.

The following examples serve to better illustrate the invention. It will be understood, however, that although these examples may describe in detail certain preferred operation conditions of the invention, they are given primarily for purposes of illustration and the invention in its broad aspects is not limited thereto.

The source for the graphite used in these examples was a natural source. Where reference is made to a percentage of fluorine gas, unless otherwise indicated, the balance is nitrogen as diluent.

EXAMPLE 1

2.8 g of 25% doped graphite antimony pentachloride were placed in a nickel reaction boat and heated for 6 hours at 250° C. in a 15% fluorine gas stream. 4 g of a snow white material were isolated. The fluorine-to-carbon ratio analysed as 0.99/1. The final composition was thus assigned as $CF_1$.

EXAMPLE 2

5 g of 25% doped graphite antimony pentachloride were placed in a nickel reaction boat and heated for 8 hours at 500° C. in a 15% fluorine gas stream. Due to the ease of fluorination of the intercalate, substantial formation of fluorinated alkanes, i.e., $C_2F_6$, etc. formed at this temperature. 4.2 g of a snow white material were isolated. The fluorine-to-carbon ratio analysed as 1.13/1. The final composition was assigned $CF_{1.13}$. It is seen from this example that lower reaction temperatures are preferred.

EXAMPLE 3

5 g of 25% doped graphite antimony pentachloride were placed in a nickel reaction boat and heated for 7 hours at 400° C. in a 20% fluorine gas stream. 5.5 g of a snow white material were isolated. The fluorine-to-carbon ratio analysed as 1.1/1 and the final composition was assigned as $CF_{1.1}$.

EXAMPLE 4

4 g of 25% doped graphite antimony pentachloride were heated in a nickel reaction boat for 8 hours at 300°–350° C. in a 20% fluorine gas stream. 6.3 g of a white solid were isolated. The fluorine-to-carbon ratio analysed at 1.02/1. The final composition was thus assigned as $CF_{1.02}$.

The reaction conditions for this Example 4 were identical to that of Example 3 except that a reservoir was added to the vent line to trap the $SbF_5$ evolved during the course of the reaction. This $SbF_5$ was reacted with graphite according to the procedure of Lalancette as described in J.C.S. Chem. Comm., (1973) p. 815 to synthesize the graphite/antimony pentafluoride intercalate. This intercalate was subsequently reacted with a 15% fluorine gas stream for 7 hours at 350°–400° C. to produce $CF_x$ with an x value of equal to 1.1. The $SbF_5$ which is evolved can be trapped and recycled in the process.

EXAMPLE 5

5 g of 25% doped graphite antimony pentachloride were placed in a nickel reaction boat and heated for 7 hours at 350° C. in a 20% fluorine/80% chlorine gas stream. 5.45 g of a cream colored material were isolated. The fluorine to carbon ratio analysed as 1.05/1 and the chlorine to carbon ratio analysed as 0.08/1. The final product composition was $CF_{1.05} Cl_{0.08}$.

EXAMPLE 6

5 g of 25% doped graphite antimony pentachloride were placed in a nickel reaction boat and heated for 8 hours at 300° C. in a 20% fluorine/80% chlorine gas stream. 5.5 g of a cream colored material were isolated. The fluorine to carbon ratio analysed as 1.06/1 and the chlorine to carbon ratio analysed as 0.095/1. The final product composition was assigned as $CF_{1.06} Cl_{0.095}$.

EXAMPLE 7

5 g of 25% doped graphite antimony pentachloride were placed in a nickel reaction boat and heated for 7 hours at 450° C. in a 20% fluorine/80% chlorine gas stream. 4.78 g of a cream colored product were isolated. The fluorine to carbon ratio analysed as 1.12/1 and the chlorine to carbon ratio analysed as 0.01/1. The final product composition was assigned as $CF_{1.12} Cl_{0.01}$.

EXAMPLE 8

The off gases from experiment 7 were collected in a cold trap and consisted of a mixture of antimony halides. This liquid mixture was used to prepare intercalated graphite as described in Example 4. The resulting intercalate was heated for 7 hours at 350° C. in a 20% fluorine/80% chlorine gas stream. The product analysed as $CF_{1.06} Cl_{0.073}$.

It will be apparent that minor variations of this procedure can be used to produce other $CF_x$ compounds of various stoichiometries in addition to those specifically set forth herein. Further, it will be understood that additional variations may be made in the several conditions, ranges and limitations disclosed without departing from the scope and spirit of this invention.

What is claimed:

1. A method of preparing graphite based carbon fluoride or carbon fluoride chloride comprising:
    (a) heating graphitic carbon intercalated with a Group V-A metal pentahalide in a gaseous fluorine or fluorine/chlorine atmosphere to a temperature range from about 250° to about 500° C.; and
    (b) maintaining the temperature in step (a) for a sufficient time to allow formation of carbon fluoride or carbon fluoride chloride.

2. The method of claim 1 wherein a gaseous fluorine atmosphere is employed to produce carbon fluoride.

3. The method of claim 1 wherein a gaseous fluorine/chlorine atmosphere is employed to produce carbon fluoride chloride.

4. The method according to claim 2 wherein the Group V-A pentahalide is selected from the group consisting of antimony and arsenic -pentachlorides, -pentabromides, -pentafluorides or -pentaiodides.

5. The method according to claim 2 wherein the Group V-A pentahalide compound is antimony pentachloride.

6. The method according to claim 2 wherein the temperature in step (b) is maintained from about 275° C. to about 400° C.

7. The method according to claim 2 wherein the temperature in step (b) is maintained from about 300° C. to 350° C.

8. The method according to claim 2 wherein the time in step (b) is from about 4 hours to about 12 hours.

9. The method according to claim 2 wherein the time in step (b) is from about 4 hours to about 8 hours.

10. The method of claim 2 wherein the percent fluorine in the gaseous fluorine atmosphere is between about 5–50% by volume.

11. The method of claim 2 wherein the percent fluorine in the gaseous fluorine atmosphere is between about 15% to 20%.

12. The method of claim 2 wherein the graphite is selected from the group consisting of natural or synthetic graphites.

13. The method according to claim 3 wherein the Group V-A pentahalide is selected from the group consisting of antimony and arsenic -pentachlorides, -pentabromides, -pentafluorides or -pentaiodides.

14. The method according to claim 3 wherein the Group V-A pentahalide compound is antimony pentachloride.

15. The method according to claim 3 wherein the temperature in step (b) is maintained from about 275° C. to about 400° C.

16. The method according to claim 3 wherein the temperature in step (b) is maintained from about 300° C. to 350° C.

17. The method according to claim 3 wherein the time in step (b) is from about 4 hours to about 12 hours.

18. The method according to claim 3 wherein the time in step (b) is from about 4 hours to about 8 hours.

19. The method of claim 3 wherein the percent fluorine/chlorine in the gaseous fluorine atmosphere is between about 5–50% by volume.

20. The method of claim 3 wherein the percent fluorine/chlorine in the gaseous fluorine atmosphere is between about 15% to 20%.

21. The method of claim 3 wherein the graphite is selected from the group consisting of natural or synthetic graphites.

* * * * *